United States Patent
Guthery

(10) Patent No.: US 7,097,107 B1
(45) Date of Patent: Aug. 29, 2006

(54) PSEUDO-RANDOM NUMBER SEQUENCE FILE FOR AN INTEGRATED CIRCUIT CARD

(75) Inventor: Scott B. Guthery, Newton, MA (US)

(73) Assignee: Mobile-Mind, Inc., Watertown, MA (US)

( * ) Notice: Subject to any disclaimer, the term of this patent is extended or adjusted under 35 U.S.C. 154(b) by 305 days.

(21) Appl. No.: 10/448,450

(22) Filed: May 29, 2003

Related U.S. Application Data

(60) Provisional application No. 60/461,388, filed on Apr. 9, 2003.

(51) Int. Cl.
*G06K 19/06* (2006.01)

(52) U.S. Cl. ..................... 235/492; 235/487

(58) Field of Classification Search ............... 235/487, 235/492; 380/262, 30, 46, 268; 705/65; 708/250–256; 713/172
See application file for complete search history.

(56) References Cited

U.S. PATENT DOCUMENTS

| | | | |
|---|---|---|---|
| 4,510,673 A | 4/1985 | Shils et al. | |
| 4,827,514 A | 5/1989 | Ziolko et al. | |
| 4,944,009 A | 7/1990 | Micali et al. | |
| 5,293,029 A * | 3/1994 | Iijima | 235/380 |
| 5,434,917 A | 7/1995 | Naccache et al. | |
| 5,778,069 A * | 7/1998 | Thomlinson et al. | 380/262 |
| 5,815,709 A | 9/1998 | Waldo et al. | |
| 5,835,597 A | 11/1998 | Coppersmith et al. | |
| 5,856,659 A * | 1/1999 | Drupsteen et al. | 235/380 |
| 5,881,155 A | 3/1999 | Rigal | |
| 5,920,628 A | 7/1999 | Indeck et al. | |
| 5,995,533 A | 11/1999 | Hassan et al. | |
| 6,003,014 A * | 12/1999 | Lee et al. | 705/13 |
| 6,014,445 A | 1/2000 | Kohda et al. | |
| 6,148,407 A | 11/2000 | Aucsmith | |
| 6,314,440 B1 | 11/2001 | O'Toole et al. | |
| 6,339,645 B1 | 1/2002 | Smeets | |
| 6,366,967 B1 | 4/2002 | Wagner | |
| 6,484,948 B1 | 11/2002 | Sonoda | |
| 6,570,990 B1 | 5/2003 | Kohn et al. | |
| 6,581,078 B1 | 6/2003 | Liardet | |
| 6,865,660 B1 * | 3/2005 | Duncan | 711/217 |
| 6,915,471 B1 * | 7/2005 | Miller | 714/738 |
| 2001/0023423 A1 | 9/2001 | Marinet | |

(Continued)

FOREIGN PATENT DOCUMENTS

EP 0861479 B1 12/1999

(Continued)

OTHER PUBLICATIONS

Gassend, Physical Random Functions, Masters Thesis, MIT, Feb. 2003.

(Continued)

*Primary Examiner*—Thien M. Le
*Assistant Examiner*—Kumiko C. Koyama
(74) *Attorney, Agent, or Firm*—Jacobs & Kim LLP; David A. Jacobs

(57) ABSTRACT

An integrated circuit card includes a microprocessor, an integral memory element, and a pseudo-random number sequence file stored therein. The pseudo-random number sequence file includes a pseudo-random number sequence generator operable to generate an instance of a sequence of apparently random numbers when executed, values for the parameters of the pseudo-random number sequence generator, and an Initial Value for the sequence of random numbers. The microprocessor is operable to execute an operation on the pseudo-random number sequence file in response to a predetermined input from an external source.

2 Claims, 12 Drawing Sheets

U.S. PATENT DOCUMENTS

| | | |
|---|---|---|
| 2001/0056534 A1 | 12/2001 | Roberts |
| 2002/0047049 A1 | 4/2002 | Perron et al. |
| 2002/0159588 A1 | 10/2002 | Kauffman et al. |
| 2002/0172359 A1 | 11/2002 | Saarinen |
| 2003/0065691 A1 | 4/2003 | Schmidt |
| 2003/0095659 A1 | 5/2003 | Ishihara et al. |

FOREIGN PATENT DOCUMENTS

| | | |
|---|---|---|
| EP | 0949563 B1 | 12/2002 |
| EP | 1308909 A1 | 5/2003 |
| WO | WO 01/061917 A1 | 8/2001 |
| WO | WO 01/91366 A2 | 11/2001 |
| WO | WO 01/93013 A1 | 12/2001 |
| WO | WO 02/14884 A2 | 2/2002 |
| WO | WO 02/21760 A1 | 3/2002 |
| WO | WO 02/47272 A2 | 6/2002 |
| WO | WO 02/054195 A2 | 7/2002 |
| WO | WO 02/058361 A2 | 7/2002 |
| WO | WO 02/069558 A1 | 9/2002 |
| WO | WO 02/071204 A1 | 9/2002 |
| WO | WO 02/093809 A2 | 11/2002 |
| WO | WO 03/007608 A1 | 1/2003 |
| WO | WO 03/019842 A2 | 3/2003 |

OTHER PUBLICATIONS

Gassend et al, Silicon Physical Random Functions, Computer and Communication Security Conference, Nov. 18, 2002, Washington, D.C.

Gassend et al., Controlled Physical Random Functions, 18th Annual Computer Security Applications Conference, Dec. 2002.

Gassend et al., Delay-Based Circuit Authentication and Applications, Laboratory for Computer Science, Massachusetts Institute of Technology, Oct. 24, 2002.

Kahng et al., Robust IP Watermarking Methodologies for Physical Design, ACM/IEEE Design Automation Conference, Jun. 1998, pp. 782-787.

Kahng et al., Copy Detection for Intellectual Property Protection of VLSI Design, IEEE/ACM International Conference on Computer Aided Design, Nov. 1999, pp. 600-604.

Koushanfar et al., Hardware Metering, 38th ACM/IEEE Design Automation Conference, Jun. 18, 2001, pp. 490-493, Las Vegas, NV.

Koushanfar et al., Intellectual Property Metering, Information Hiding 2001, Springer-Verlag Lecture Notes in Computer Science 2137, pp. 81-95.

Lofstrom et al., IC Identification Circuits Using Device Mismatch, ICID, Oct. 28, 1999.

A. E. Caldwell et al., "Effective Iterative Techniques for Fingerprinting Design IP," Design Automation Conference, pp. 843-848, 1999.

* cited by examiner

PSEUDO-RANDOM NUMBER SEQUENCE FILE FOR AN INTEGRATED CIRCUIT CARD

CROSS-REFERENCE TO RELATED APPLICATIONS

This application is based upon and claims priority from U.S. Provisional Patent Application Ser. No. 60/461,388, filed 9 Apr. 2003, entitled PSEUDO-RANDOM NUMBER SEQUENCES ON AN INTEGRATED CIRCUIT CARD.

BACKGROUND OF THE INVENTION (1) Field of the Invention

The present invention relates generally to integrated circuit cards ("ICCs") or "smart cards", and more particularly to a pseudo-random number sequence file for an integrated circuit/smart card that has a standard-compliant interface and that is operative to generate pseudo-random numbers within the integrated circuit/smart card for use in a variety of applications external and internal to the integrated circuit/smart card. The hardware and software features of the integrated circuit/smart card ensure the security of the functional characteristics and output of the pseudo-random number generator stored within the pseudo-random number sequence file of the integrated circuit/smart card while the standard-compliant interface facilitates the integration of the output of pseudo-random number sequence file into application programs and other security systems.

(2) Description of Related Art

Smart Cards:

Conventional integrated circuit cards ("ICCs") or smart cards (the terminology ICC(s) and/or smart card(s) is used interchangeably herein to identify a plastic card with an embedded microchip) are typically credit card-sized, programmable computer devices having operatively coupled logic and memory circuitry. Smart cards can be configured to provide identification and cryptographic capabilities that support secure operation of or access to applications, other devices, files, services, and the like.

The smart card can include electrical interface contacts ("smart card with contacts"), which are exposed on an external surface of the card and configured to enable a smart card reader or other device to interact with the applications, features, files or other contents of the smart card. Alternatively, the smart card can communicate with the smart card reader using radio frequency transmissions ("contactless smart card"). The smart card reader may be further operatively coupled to a computer or other device that is programmed to interact with the smart card in some manner. The smart card reader can be part of a separate peripheral device or integrated into such a peripheral device. For example, a mobile telephone may include an integral smart card interface. In addition, the smart card can be either fixed in place or removable.

Smart cards are increasingly used in financial and commercial transactions in the place of magnetic stripe credit/debit cards. They are also employed in digital rights management applications such as in set top boxes (STBs) to authorize the reception and consumption of digital media. They are also used in identity and authentication applications where they store personal identification numbers (PIN) and biometric templates.

Rather than employing information encoded on a magnetic stripe, smart cards include a microprocessor and a memory element in a tamper-resistant and tamper-evident enclosure typically fabricated from a relatively-rigid plastic material. Using their microprocessor capabilities, smart cards can interact directly with computer applications and are able to securely communicate a broad and detailed range of information regarding cardholder identity, cardholder authorizations, transaction formation, or other information.

FIG. 1 (Prior Art) shows an exemplary smart card 10 with contacts. Substantially the size of a credit card, the smart card 10 includes a microprocessor 12 with an integral memory element and conductive contacts 13. Microprocessor 12 is typically a single wafer integrated circuit (IC) mounted on, or embedded within the body of the plastic card. The integral memory element provides storage capacity for, inter alia, the files and instruction sets (programs) of the smart card 10. Conductive contacts 13 provide an interface mechanism with a terminal (e.g., a card reader) to electrically transfer data between the terminal and the smart card. As noted above, some smart cards do not include conductive contacts 13, but instead transmit and receive information via electromagnetic mechanisms such magnetic or electrical fields or other proximate coupling means, or via radio or infrared transmissions or other remote coupling means.

FIG. 2 (Prior Art) shows an exemplary smart card 10 with contacts 13 that is used in a mobile telephone. The functional components of the smart card, a microprocessor 12 with an integral memory element and the contacts 13, are identical to the functional components shown in FIG. 1 and described above. Most of the plastic of the credit card has been removed to facilitate its placement inside the mobile telephone handset.

FIG. 3 (Prior Art) shows an exemplary "contactless" smart card 10 that might be used in a public transport system to hold tickets or other system use rights that includes a microprocessor 12 with an integral memory element, an embedded antenna 11, and contactless receptors 13 as described above.

Typical smart card operating systems support a modest file system. Because a smart card typically has no storage peripherals (such as the storage peripherals of a personal computer), a smart card file is typically just a contiguous block of smart card memory. Typical smart card operating systems support conventional file operations such as create, delete, read, write, and update on all files. In conventional smart card systems, associated with each file on a smart card is an access control list. This access control list records what operations, if any, each card identity or group of card identities is authorized to perform on any particular file. For example, identity A may be able to read a particular file but not update it, whereas identity B may be able to read, write, and even alter the access control list of the file.

ICCs or smart cards provide low-cost, portable, tamper-resistant and tamper-evident storage devices for data. They also contain a computational means to both control access to this data and to apply this data in information processing algorithms and applications. Given these capabilities, ICCs or smart cards can be used to store and apply electronic cash, cryptographic keys, sensitive personal information and cardholder authorizations. Such applications naturally require that this information cannot be read or altered without proper authorization, in particular by an unauthorized person in possession of the smart card.

Pseudo-Random Number Sequences:

A tamper-resistant source of pseudo-random numbers is of great utility in many data processing and information technology applications, particularly those that involve security, such as digital rights management, user and machine authentication, and cryptography. For example, a pseudo-random number sequence can be used to scramble an audio or video signal (digital rights management), provide unique passwords (authentication), or as a source of one-time encryption keys (cryptography).

A pseudo-random number sequence has the property that it is difficult to determine the nth number in the sequence even when all previous n−1 numbers are known. In other words, the sequence appears to be a random sequence of numbers even though it is actually produced by a formula/algorithm called a pseudo-random number generator. Since the nth number in the sequence can be determined if the generator formula is known, in security applications using pseudo-random number sequences it is important to ensure that the formula cannot be discovered.

It would be desirable to provide, in a smart card, a convenient and efficient method to produce pseudo-random number sequences, to implement pseudo-random number generators within the smart card and to provide a convenient and standard-based interface to pseudo-random number sequences and pseudo-random number generators as stored in a smart card.

BRIEF SUMMARY OF THE INVENTION

The present invention provides a new kind of file on an ICC or smart card that uses a pseudo-random number generator to generate and store instances of a pseudo-random number sequence and provide access thereto for other applications, both those external to and stored in the ICC or smart card. The casting of the pseudo-random number sequence as a file on an ICC provides a familiar way to define, utilize and control access to the instances of the pseudo-random number sequence while the tamper-resistant properties of the ICC and the access control mechanisms of the ICC computational means ensure that the pseudo-random number formula generating the instances of the pseudo-random number sequence cannot be discovered or altered by an authorized entity possessing the card.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF THE INVENTION

Figure 1:
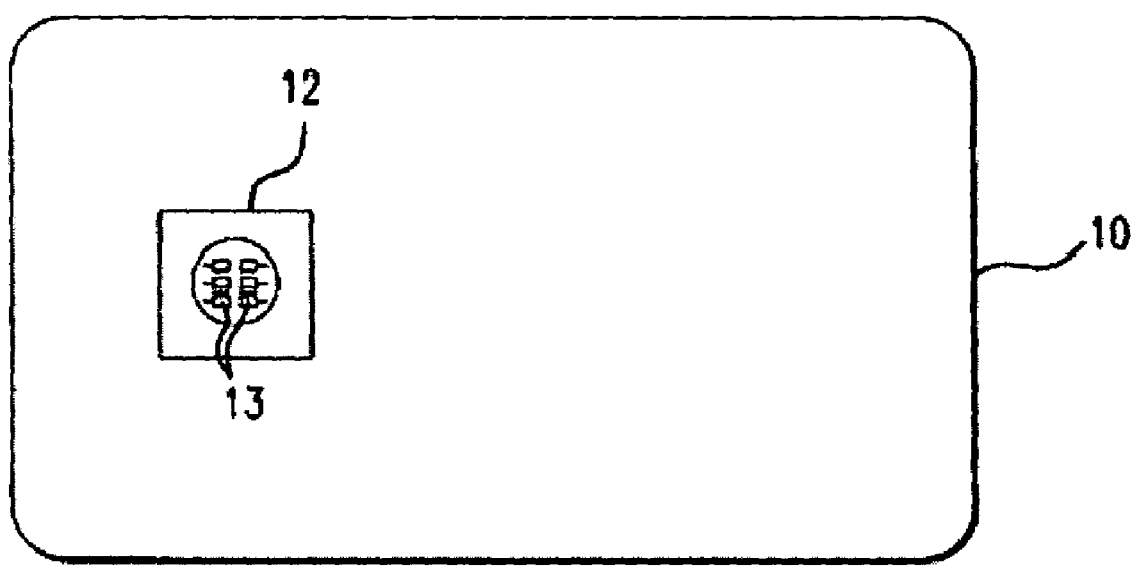
FIG. 1, FIG. 2 and FIG. 3 are schematic diagrams of three forms of conventional ICCs or smart cards.

Example of Pseudo-Random Number Generators:

Many types (numbering in the thousands) of pseudo-random number generators are disclosed in the prior art. By way of example, U.S. Pat. No. 5,835,597 to Coppersmith et al. (Nov. 10, 1998) describes a pseudo-random function that maps an index and an encryption key to a pseudo-random bit string useful for constructing a stream cipher. U.S. Pat. No. 4,944,009 to Micali et al. (Jul. 24, 1990) discloses a method of generating a pseudo-random sequence from a seed random sequence of substantially shorter length.

For the purpose of describing the invention herein we will consider and describe an example employing a widely used pseudo-random number generator (formula or algorithm) known as a linear congruential generator (LCG). (As noted in U.S. Pat. No. 4,944,009, the LCG is a classical pseudo-random number generator based on the recursion $x_{i+1} = ax_i + b(\bmod N)$). However, those skilled in the relevant art will understand that the present invention can use any pseudo-random number generator.

For our example, let M be a large positive integer, and let a, b and $s_0$ be three positive integers greater than zero but less than M. The LCG defined by the positive integers M, a, b, and $s_0$ (where $s_0$ is the initial value of the sequence when i=0) is $$s_i = (a * s_{i-1} + b) \bmod M$$

for i=1, 2, 3, . . . The nth element of the sequence is given by $$s_n = (a * s_{n-1} + b) \bmod M$$

For M=17, a=7, b=3 and $s_0$=9 for example, Table I illustrates instances of the random number sequence for index i values from one (1) to sixteen (16):

TABLE I

| Index, i | Instance of Sequence, $s_i$ |
|---|---|
| 0 | 9 |
| 1 | (7 * 9 + 3) mod 17 = 15 |
| 2 | (7 * 15 + 3) mod 17 = 6 |
| 3 | (7 * 6 + 3) mod 17 = 11 |
| 4 | (7 * 11 + 3) mod 17 = 12 |
| 5 | (7 * 12 + 3) mod 17 = 2 |
| 6 | (7 * 2 + 3) mod 17 = 0 |
| 7 | (7 * 0 + 3) mod 17 = 3 |
| 8 | (7 * 3 + 3) mod 17 = 7 |
| 9 | (7 * 7 + 3) mod 17 = 1 |
| 10 | (7 * 1 + 3) mod 17 = 10 |
| 11 | (7 * 10 + 3) mod 17 = 5 |
| 12 | (7 * 5 + 3) mod 17 = 4 |
| 13 | (7 * 4 + 3) mod 17 = 14 |
| 14 | (7 * 14 + 3) mod 17 = 16 |
| 15 | (7 * 16 + 3) mod 17 = 13 |
| 16 | (7 * 13 + 3) mod 17 = 9 |
| ... | ... |

This specific example of a linear congruential pseudo-random number generator can only generate 16 different numbers, namely the instances (or pseudo-random number sequence) for index i having values of 1, 2, . . . , 16. In preferred implementations of the invention the number of different sequence numbers that the pseudo-random number generator would be configured to generate would be very large, on the order of $10^{12}$ or more.

Creating a Pseudo-Random Number Sequence File:

In accordance with the present invention, a new kind of file is created on an ICC, which is identified as a pseudo-random number sequence file or a sequence file for short. In one preferred embodiment of the invention, a pseudo-random number sequence file on an ICC is created that comprises, in addition to the usual information associated with a ICC file such as file name, file size, file access control information, etc., the following elements:

(1) a pseudo-random number sequence generator (algorithm or formula) that is operative to generate an instance of a sequence of random numbers in response to a predetermined input—in the context of the linear congruential algorithm example, the algorithm $(s_n = a*s_{n-1} + b) \bmod M$;

(2) an instruction set for running the pseudo-random number sequence generator to generate a particular instance of the random number sequence in response to a predetermined input wherein the particular instance is one random number of the sequence of random numbers;

(3) values for the parameters of the random number generator stored in the sequence file—in the context of the linear congruential algorithm example above, values for the integers a, b, and M;

(4) an instruction set for changing one of the generator parameter values in response to a predetermined input;

(5) an Initial Value for the sequence of random numbers generated by the random number generator—in the context of the linear congruential algorithm example above, the value of $s_0$; and (6) allocated space for storing in the Sequence File:

(i) the particular instance of the random number sequence (see discussion below regarding Current Value) generated by the random number generator in response to a predetermined input (upon creation or after initialization of the sequence file, this allocated space is empty since the Current Value equals the Initial Value); and (ii) an index value identifying the particular instance of the random number sequence (see discussion below regarding Current Index) generated by the random number generator in response to a predetermined input.

As used above, it is understood that the term "value" may refer to a single numerical value such as 17 or 37, or it may refer to a structured composite of numerical values such as a 3-tuple, e.g., (18, 67.2, −587.23).

When the sequence file is created on the ICC, it is preferably endowed with one or the other or both of two additional pieces of current state information called the Current Value and the Current Index. The Current Value, i.e., see item (6)(i) above and discussion below, is the value of the particular instance of the random number most recently generated by the pseudo-random number sequence generator—in the context of the linear congruential algorithm example above, the value of $s_i$. The Current Index, i.e., see item (6)(ii) above and discussion below, is the index value that identifies the Current Value generated by the pseudo-random number sequence generator, i.e., in the context of the linear congruential algorithm example above, the value of i. The Current Value is initialized to the Initial Value and the Current Index is initialized to the value zero (0) when the sequence file is created or reset by an operating command (see discussion below).

Figure 4:
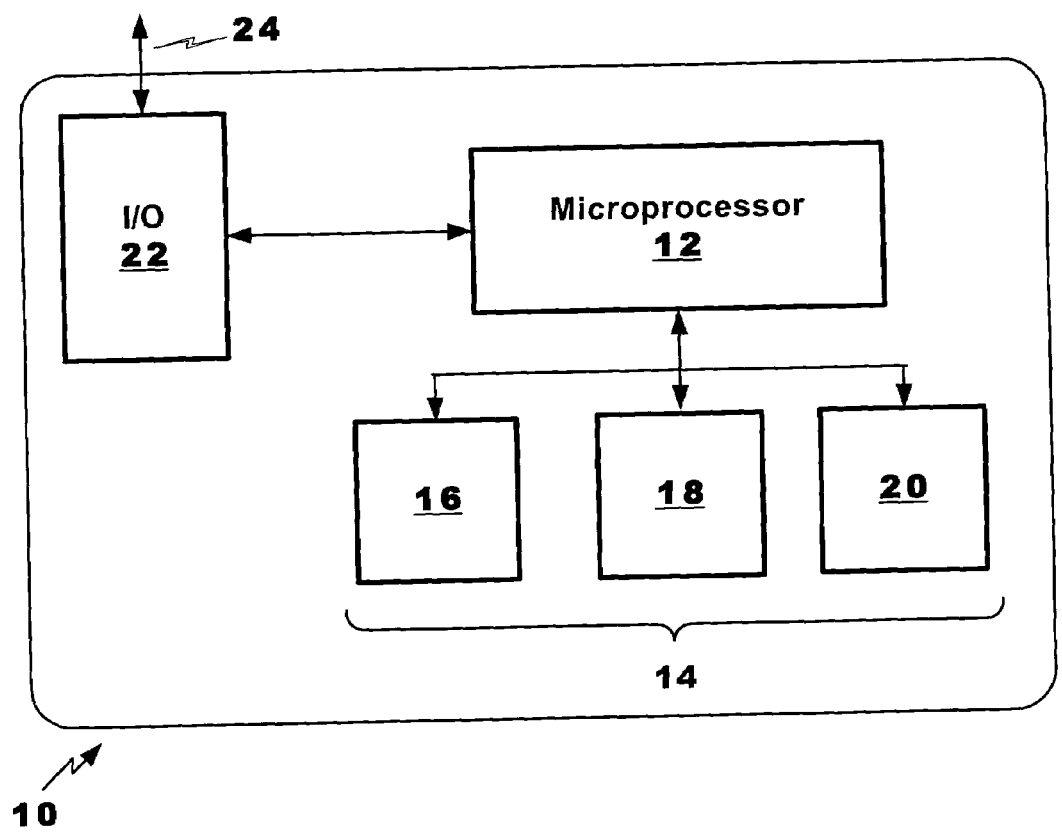
FIG. 4 illustrates an exemplary integrated circuit/smart card that can be used in the practice of the present invention.

Referring now to the drawings wherein like reference numerals identify corresponding or similar elements throughout the several views, FIG. 4 illustrates in further detail an exemplary integrated circuit/smart card 10 that can be used in the practice of the present invention. The card 10 comprises a microprocessor 12 with an integral memory system 14 that includes a first memory module 16, a second memory module 18, and a non-volatile memory module 20, and an I/O interface 22. The microprocessor 12 is any suitable central processing unit that is operative to execute stored instruction sets to implement and manage the conventional functions of integrated circuit/smart cards (e.g., protocol(s) for communication with external devices and/or applications) as well as the specific functions described herein for the pseudo-random number sequence file according to the present invention. It is to be understood that the description of the integral memory system 14 provided herein is by way of illustration only and is not intended to be limiting.

The first memory module 16, e.g., RAM, provides storage for calculated results, e.g., calculations involved in generating a particular instance of the pseudo-random number sequence using the pseudo-random number sequence generator, and also functions as stack memory for the integrated circuit/smart card 10. The second memory module 18, e.g., ROM, provides storage for the operating system of the card 10, fixed data, and any standard instruction sets (for implementing the conventional functions associated with the card 10). The non-volatile memory module 20, e.g., flash memory (flash RAM), EPROM, EEPROM, or FRAM (ferroelectric RAM) provides persistent storage for programs and/or data that must not be lost when communications between the card 10 and external devices and/or applications are terminated (i.e., the card 10 is powered down) while concomitantly allowing the alteration of some or all of such stored data and/or the addition of new data under specified conditions. Each of these memory modules 16, 18, 20 is partitioned into one or more blocks of memory to facilitate the storage and retrieval of programs and/or data in such memory modules 16, 18, 20.

Figure 2:
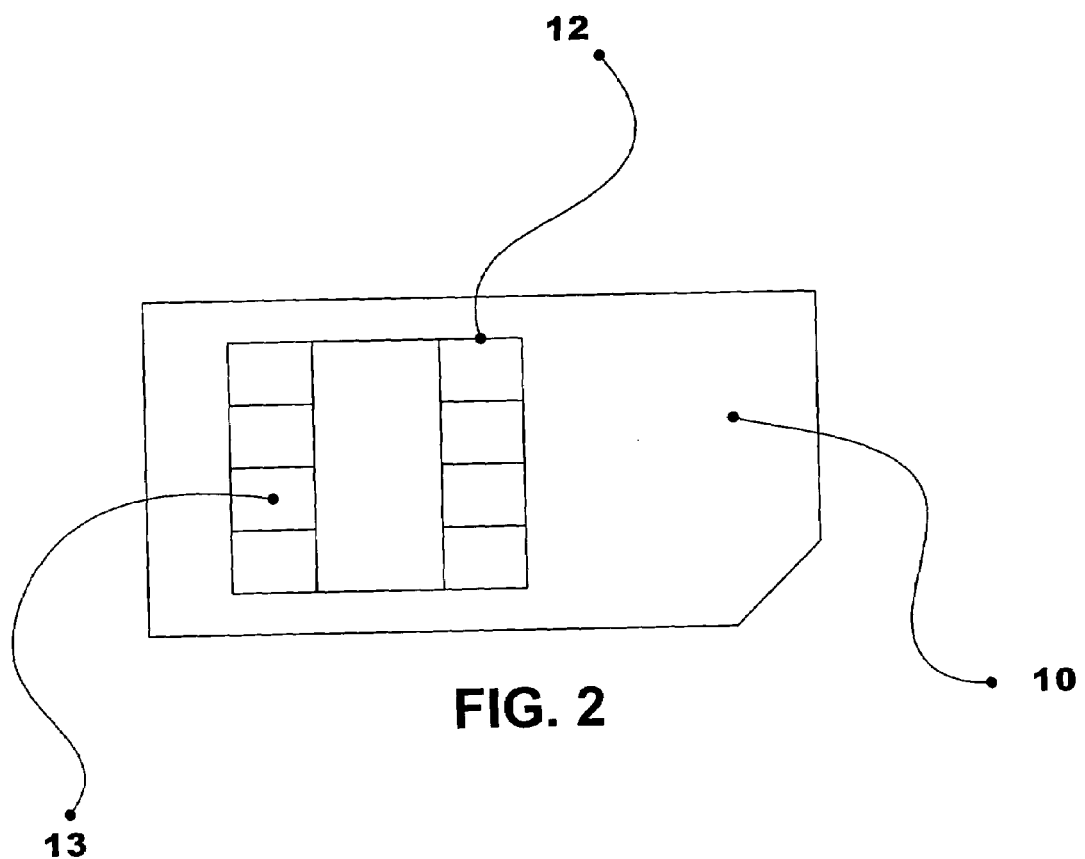
Figure 3:
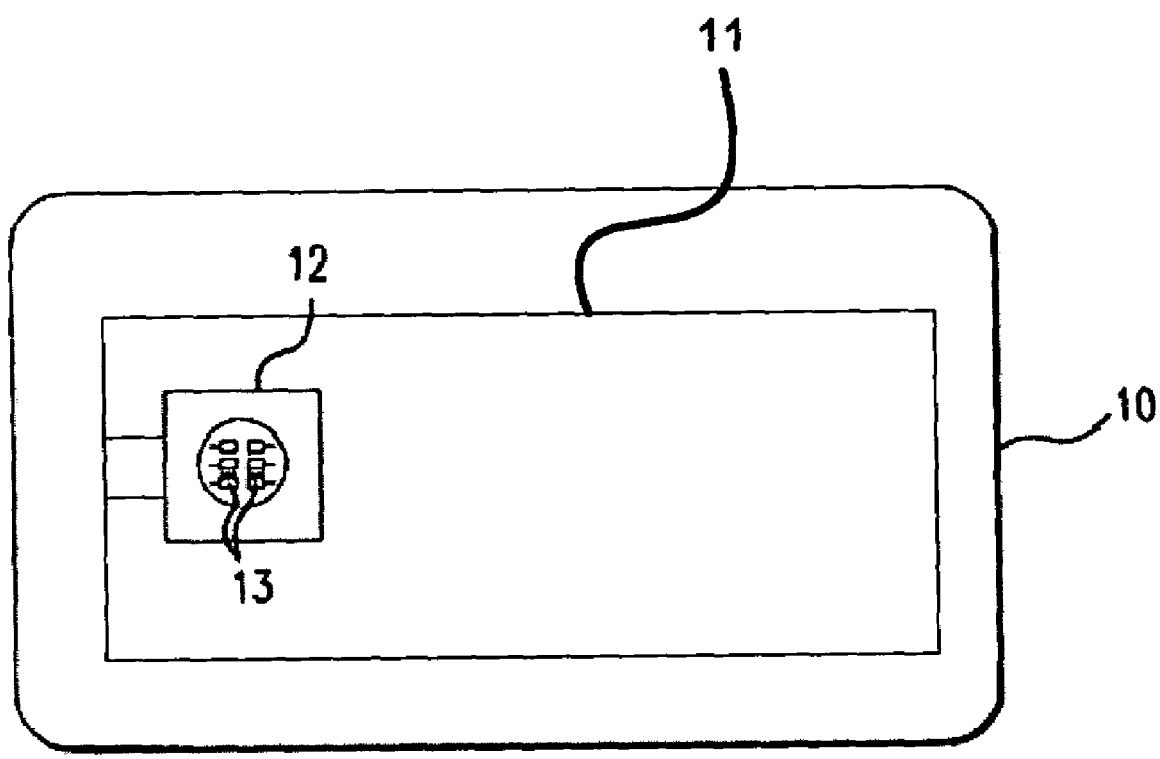

The I/O interface 22 is the interface mechanism of the card 10 that facilitates communications between the card 10 and external devices and/or applications (see reference numeral 24 in FIG. 4 that identifies the external communication link). The I/O interface 22 can include conductive contacts of the type described above with respect FIGS. 1 and 2 for direct contact with external devices and/or applications and/or a radiant-energy port for wireless communications with external devices and/or applications (the 'contactless' smart card illustrated in FIG. 3).

Files of the integrated circuit/smart card 10 are stored in one or more of the elements comprising the integral memory system 14 associated with the microprocessor 12. Which memory element is used to store any particular file depends, inter alia, on the specific characteristics of the particular file. For example, a temporary file created on the card 10 for one specific transaction may be stored in the first memory module 14 inasmuch as the temporary file need not be retained when power is removed from the card 10. A read-only file that is accessed each time the card 10 is powered up and that contains programs and/or data that are not subject to change may be stored in the second memory module 16 since the file and its contents are retained in ROM when the card 10 is powered down. Or, a file that contains programs and/or data that are subject to updating and must be retained may be filed in the non-volatile memory module 18 since persistent memory such as an EEPROM satisfies such storage conditions.

Files can be stored in the integral memory system 14 of the integrated circuit/smart card 10 in a non-structured manner, i.e., randomly in any contiguous block of memory, in a hierarchical (tree) structure (see, e.g., International Application No. PCT/EP01/14861 published as International Publication No. WO 02/054195 A2), or in any other memory architecture known to those skilled in the art. To enhance access to the files stored on the card 10, a directory (or catalog or folder) is included in the integral memory system 14 to identify the start point of any file stored in the integral memory system 14.

Figure 5A:
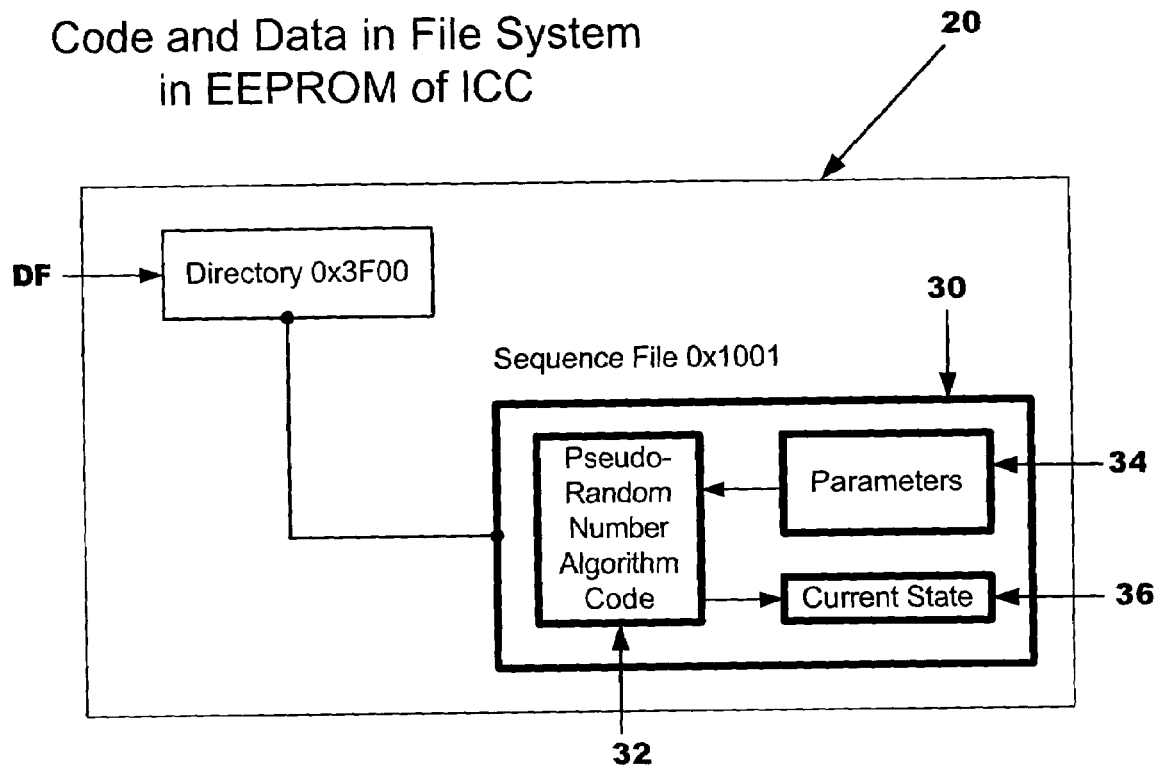
FIG. 5A is a schematic representation of one embodiment of the present invention wherein the instruction sets and the parametric and state information pertaining to a specific pseudo-random number sequence represented by a sequence file according to the present invention are stored within the sequence file itself.
Figure 5B:
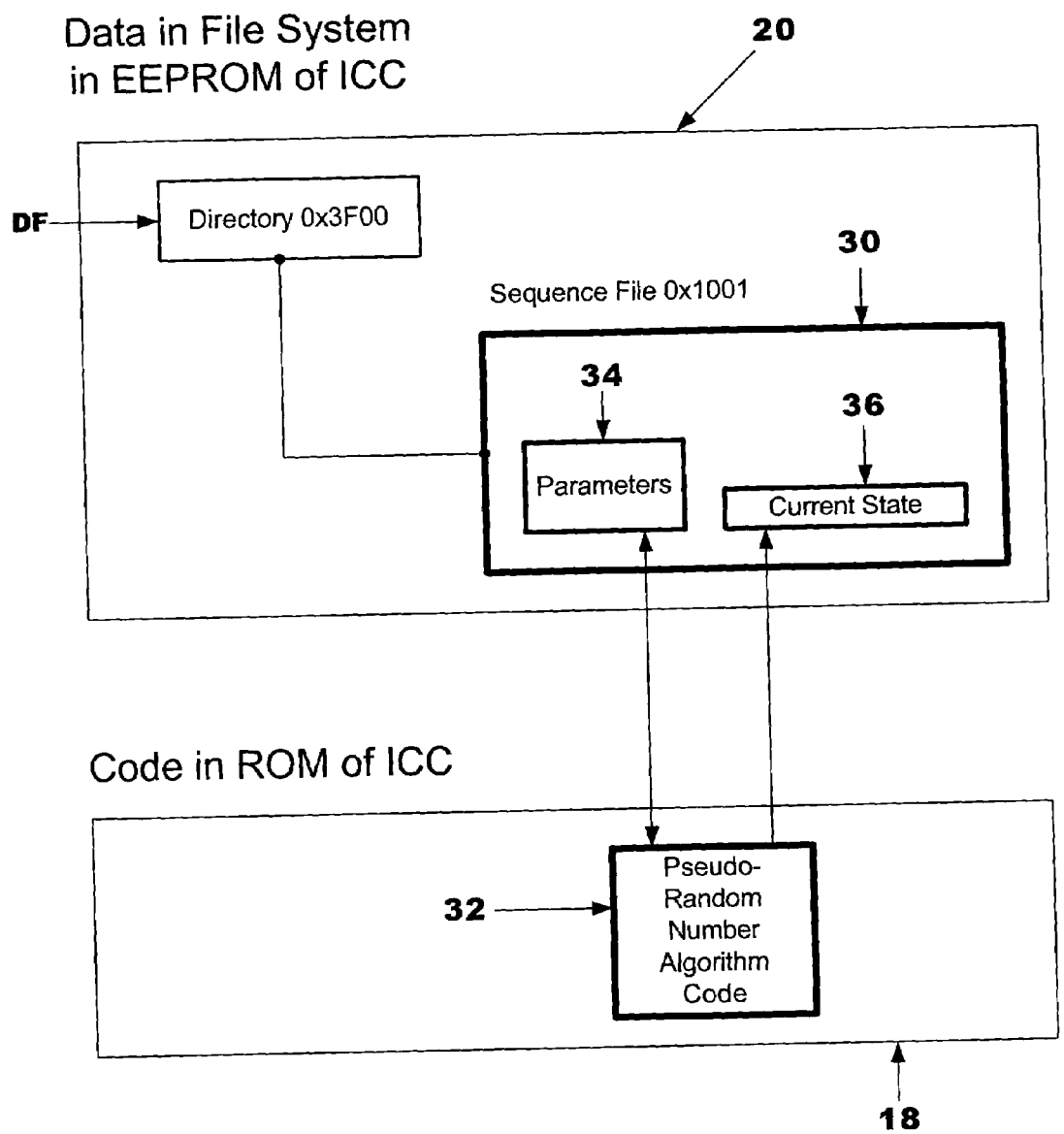
FIG. 5B is a schematic representation of another embodiment of the present invention wherein the parametric and state information pertaining to a specific pseudo-random number sequence represented by a sequence file according to the present invention is stored within the sequence file itself, but the instruction sets that are operative to generate pseudo-random numbers from such data are stored external to the sequence file and may be shared among multiple sequence files.
Figure 5C:
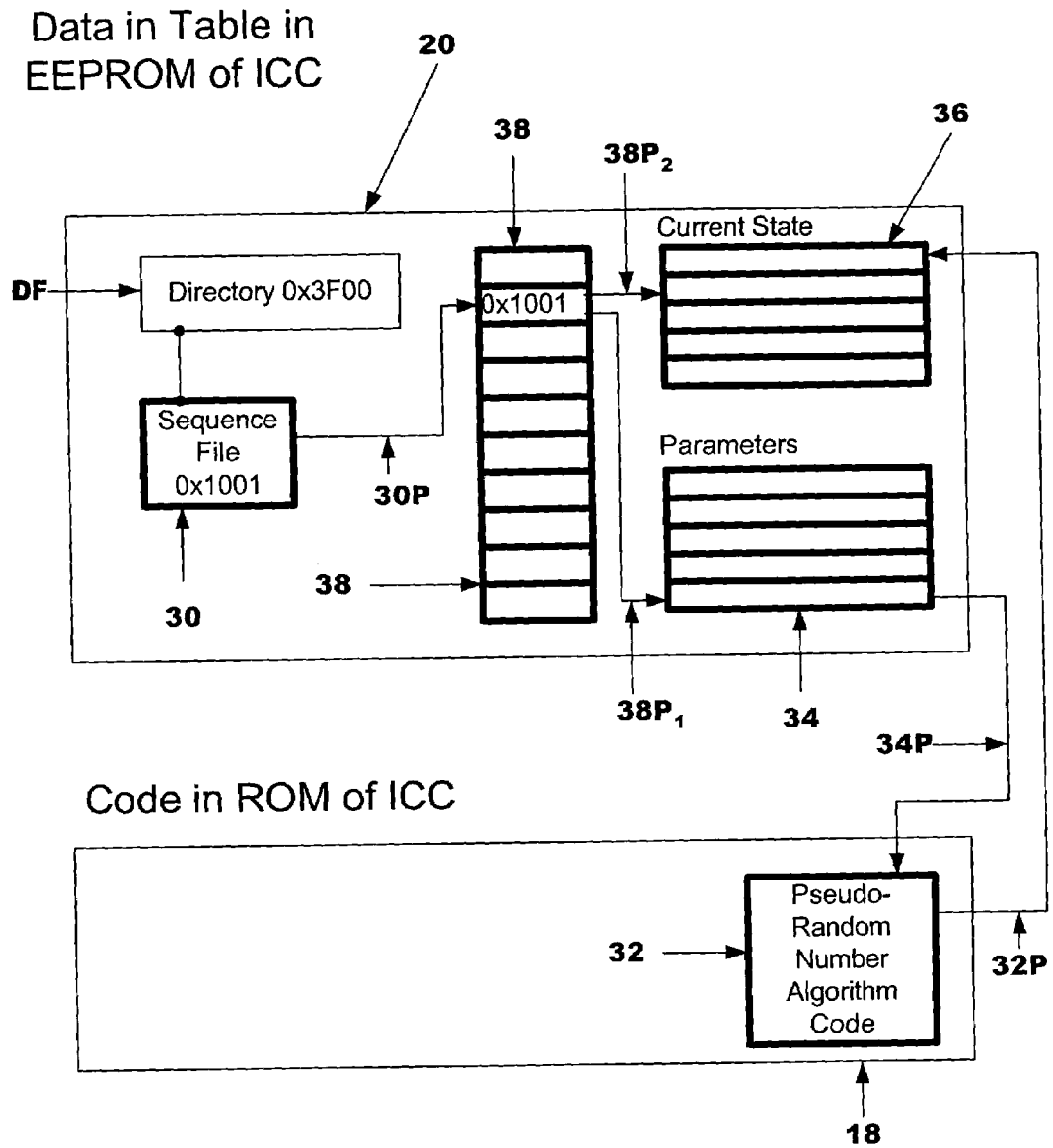
FIG. 5C is a schematic representation of yet a further embodiment of the present invention wherein the instruction sets and the parametric and state information pertaining to a pseudo-random number sequence are all stored outside the sequence file itself.

Referring to FIGS. 5A, 5B, 5C, a pseudo-random number sequence file 30 according to the present invention comprises pseudo-random number algorithm code(s) 32 which includes the formula(s) for the pseudo-random number generators(s) and the instruction sets associated therewith (see items (1), (2), and (5) discussed above), one or more parametric data sets 34 for the pseudo-random number algorithm code(s) (32) (see item (3) discussed above), and one or more current state data sets 36 for the sequence file 30 wherein each current state data set 36 comprises an Initial Value, a Current Value and a Current Index (see items (5), (6)(i) and (6)(ii) discussed above). The algorithm code(s) 32, the parametric data set(s) 34, and the current state data set(s) 36 comprising the sequence file 30 are stored in the integral memory system 14 in integrated or distributed schemes as described below in further detail with respect to the preferred embodiments of the sequence file 30. The integrated circuit/smart card 10 also includes a directory file DF that provides enhanced access to any sequence file 30 of the integrated circuit/smart card 10.

One preferred embodiment of an integrated circuit/smart card 10 embodying a pseudo-random number sequence file 30 according to the present invention is schematically illustrated in FIG. 5A. In this preferred embodiment, the pseudo-random number sequence file 30 exhibits an integrated architecture that includes one pseudo-random number algorithm code 32, one parametric data set 34, and one current state data set 36 stored in the non-volatile memory module 20, e.g., EEPROM, of the card 10. This integrated scheme for the sequence file 30 has particular utility for cards 10 embodying only one pseudo-random number sequence file that comprises a single pseudo-random number sequence algorithm code that uses a single set of parameters to generate a single set of current state values, e.g., in protecting the exchange of e-mails between parties (see discussion below in connection with FIG. 8).

Another preferred embodiment of an integrated circuit/smart card 10 embodying a pseudo-random number sequence file 30 according to the present invention is schematically illustrated in FIG. 5B. In this preferred embodiment, the pseudo-random number sequence file 30 exhibits a distributed architecture that comprises a single parametric data set 34 and a single current state data set 36 stored in the non-volatile memory module 20, e.g., EEPROM, of the card 10, while the pseudo-random number algorithm code 32 is stored in one of the other elements of the integral memory system 14 of the card 10, preferably the second memory module 18, i.e., ROM.

This alternative embodiment of the pseudo-random number sequence file 30 has particular utility when alteration of the pseudo-random number sequence generator and/or the associated instruction sets is prohibited, i.e., pseudo-random number algorithm code 32 cannot be written over. This alternative embodiment of the sequence file 30 also has particular utility when the integrated circuit/smart card 10 includes a plurality of sequence files 30 that use the same pseudo-random number sequence generator and associated instruction sets, i.e., pseudo-random number algorithm code 32, but use different sets 34 of parametric data to generate different sets 36 of current state data. That is, each sequence file 30 has its own unique parametric data set 34 that is used to create a unique current state data set 36 using the common pseudo-random number algorithm code 32.

A further preferred embodiment of the present invention is schematically illustrated in FIG. 5C wherein the integrated circuit/smart card 10 exhibits a distributed scheme that includes a plurality of pseudo-random number sequence files 30 (only one sequence file 30 is illustrated in FIG. 5C) according to the present invention, one or more pseudo-random number algorithm codes 32 (only one algorithm code 32 is illustrated in FIG. 5C), a plurality of parametric data sets 34, a plurality of current state data sets 36, and in addition, a table 38. This particular embodiment has particular utility when the values of the parameter data sets 34 are large and may used by more than one pseudo-random number sequence algorithm code 32 and/or where sequence files 30 are linked such that, for example, the Current Value of one sequence file is defined as the Initial Value of another sequence file.

For this particular embodiment, the sequence files 30, the parametric data sets 34, the current state data sets 36, and the table 38 are stored in the non-volatile memory module 20, e.g., EEPROM, of the integrated circuit/smart card 10 while the one or more pseudo-random number algorithm codes 32 are stored in one of other elements of the integral memory system 14 of the card 10, preferably the second memory module 18, i.e., ROM. Each sequence file 30 consists of only a pointer 30P that identifies a specific field of the table 38, e.g., field 0×1001. This specific field, e.g., 0×1001, in turn, holds a number of pointers that identify the required elements for the particular sequence file 30: a first pointer $38P_1$ that identifies a specific parametric data set 34, a second pointer $38P_2$ that identifies a specific current state data set 36, a third pointer 34P that identifies a specific pseudo-random number algorithm code 32, and an optional fourth pointer 32P that identifies where the particular instance of the pseudo-random number sequence generated by the pseudo-random number generator is to be secondarily stored when sequence files are linked.

Since the second pointer $38P_2$ identifies the current state data set 36 for a particular sequence file 30, the output of the pseudo-random number generator is automatically stored in the current state data set 36 identified by the pointer $38P_2$ (as the Current Value and the Current Index, which are updated accordingly). When sequence files are linked, however, the output of the pseudo-random number sequence generator is also stored in the current state data set 36 identified by the fourth pointer 32P, e.g., the output is stored as the Initial Value in the current state data set 36 identified by the fourth pointer 32P (as exemplarily illustrated in FIG. 5C).

Figure 7:
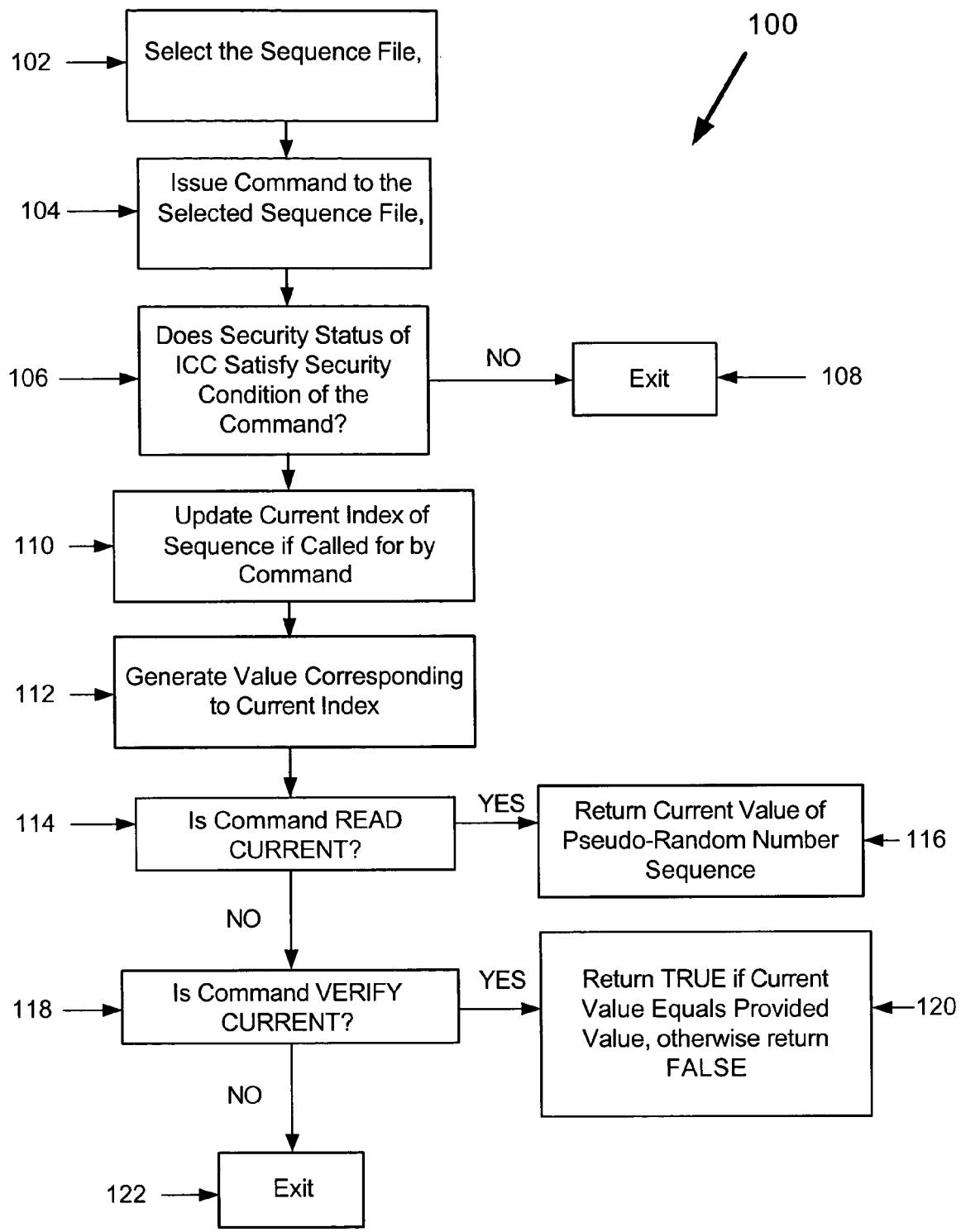
FIG. 7 is a process flow representation of an exemplary method of using the integrated circuit/smart card embodying a pseudo-random number sequence file according to the present invention using the command structure depicted in FIG. 6.

Operating on a Pseudo-Random Number Sequence File:

The capabilities of a smart card 10 embodying a pseudo-random number sequence file 30 are accessed by sending the smart card 10 a command called an Application Protocol Data Unit (APDU). Referring to FIG. 7, an APDU 40 consists of a sequence of 5 or more bytes. The first five bytes are called the command header (identified by reference numerals 42, 44, $46_1$, $46_2$, and 48 in FIG. 7) and the remaining bytes if any are called the data field (identified by reference numeral 50 in FIG. 7).

The first two bytes of the command header, the class (CLA) byte 42 and the instruction (INS) byte 44, are set by an international standards organization and by the entity producing the smart card. For example, the international standard for the CLA and INS of the APDU to read a record from a file (READ RECORD) are 0×00 and 0×B2, respectively. Each of the ICC commands discussed below can be defined by INS and CLA values established by an international standards organization and the entity producing the ICC. Those familiar with smart cards understand that the values defined by the INS and CLA bytes serve to identify which command is being used and do not effect the functionality of the command.

The third (P1) and forth (P2) bytes $46_1$, $46_2$ are parameters of the command (see discussion below). The fifth byte (Lc) 48 is the count of the number of bytes in the immediately following data field 50. If Lc is zero then no bytes follow.

The final byte of the data field (Le), if any, is the count of the number of bytes that are expected to be returned by the ICC to the application sending the APDU after the APDU has been processed by the ICC.

In addition to typical APDUs, which operate on files in the ICC file system such as CREATE, DELETE, READ, UPDATE, and TERMINATE, that may be performed on a pseudo-random number sequence file according to the present invention, the following commands implement operations that are unique to a pseudo-random number sequence file according to the present invention (there is an instruction set associated with each command that implements the corresponding operation as described below):

- READ CURRENT—Returns the current instance; i.e. the most recently generated, of the pseudo-random number sequence implemented by pseudo-random number generator of the sequence file. This is the Current Value (or the Initial Value if the Current Index has a value of zero (0)) of the pseudo-random number sequence corresponding to the Current Index. In the context of the linear congruential algorithm example described above, the Current Index would be a specific value of i where i has a value of 0, 1, 2, 3, or 4 and the Current Value would be the corresponding value of $s_i$ from Table I.
- READ NEXT—Adds one to the Current Index and implements the pseudo-random number generator to generate the next instance of the pseudo-random number sequence corresponding to this new Current Index value and returns the generated instance. In other words, READ NEXT generates the next random number or instance of the random number sequence and sets the Current Value equal to this random number. In the context of the linear congruential algorithm example described above and Table I, if the Current Index had a value of two (2)—so that the corresponding Current Value was equal to fourteen (14), see Table 1—then a READ NEXT command would increment the Current Index to a value of three (3), which would result in a new Current Value equal to zero (0) as illustrated in Table I. The READ NEXT command is one 'predetermined input' as described above that triggers the implementation of the pseudo-random number sequence generator.
- VERIFY CURRENT—Returns TRUE if the number provided in the data field of the command is equal to the instance of the pseudo-random number sequence, i.e., the Current Value, corresponding to the Current Index stored in the sequence file; otherwise returns FALSE.
- VERIFY NEXT—Adds one to the Current Index, implements the pseudo-random number sequence generator to generate the next instance of the pseudo-random number sequence corresponding to this new Current Index value, i.e., the new Current Value, and returns TRUE if the number provided in the data field of the operation is equal to the new Current Value corresponding to this new Current Index; otherwise returns FALSE. The VERIFY NEXT command is one 'predetermined input' as described above that triggers the implementation of the pseudo-random number sequence generator.
- TAG—Associates the tag provided in the data field of the command with the Current Value and/or Current Index (depending upon the value of P1 or P2). Using this command, it is possible to return to this state of the pseudo-random number sequence at some point in the future (see SET VALUE command described below) without learning or being granted permission to learn the numerical value of the Current Value and/or Current Index or to associate the current state of the sequence file with other information or events. Also, depending upon the value of P1 or P2, the TAG command is used to read back previously recorded states and their associated tag values.
- RESET—Sets the pseudo-random number sequence to its creation state by setting the Current Value to the Initial Value and the Current Index to zero (0).
- SET VALUE—Sets the Current Value and/or Current Index of the pseudo-random number sequence to the value(s) provided in the data field of the command or associated with the tag in the data field. Which of these alternative possibilities is to be operative is encoded in P1 and P2. The effect on the sequence of pseudo-random numbers generated by the pseudo-random number sequence generator due to changing of one or both of the Current Value and the Current Index is a property of the individual pseudo-random number generation algorithm and may differ from one algorithm to another.

SKIP—Sets the Current Index to its current value plus a number provided in the data field of the operation. The number can be positive or negative. Unlike the characteristics of the SET VALUE command discussed above, the SKIP command does not decouple the correlation between the Current Index and the Current Value. For example, if a SKIP command is received with a data field having a value of +4, then the pseudo-random number generator is implemented to generate the next four (4) instances of the pseudo-random number sequence where the first three instances generated are discarded and the fourth instance is stored as the Current Value in the pseudo-random number sequence file. The SKIP command can be characterized as a "roll ahead" or "roll back" of the pseudo-random number sequence.

CHANGE PARAMETER—Changes one or more parameters of the pseudo-random number sequence generator to the value(s) provided in the data field of the command. The interpretation of the data field depends on the pseudo-random number sequence generator of the pseudo-random number sequence represented by the sequence file. If P1 and P2 are both 0 and no data field is provided then the current settings of the parameters of the pseudo-random number sequence generator, the Current Value, and the Current Index, are returned.

Administration and Access Control for Operations on Sequence Files:

As is always the case when dealing with operations on files on ICCs, with a sequence file according to the present invention there is associated with each of the above-mentioned commands a Boolean expression that describes the security conditions under which the operation specified by the command may be performed in connection with such sequence file. By embodying the pseudo-random number sequence generator and the parametric and current state data for the pseudo-random number sequence generator as a sequence file on the ICC, all the protections that are provided by the ICC security architecture to data in files on the ICC are automatically provided to the pseudo-random number sequence generator and the parametric and current state data of the generator.

Thus, for example, the security condition for implementing the RESET command with respect to a particular sequence file may be that this operation may be performed only if a particular identity has been authenticated by means of an authentication protocol. In other words, only the entity authorized to perform card administration duties on the ICC or smart card is authorized to reset the current state data of a pseudo-random number sequence file to its creation state.

Or, as another example, the security condition for executing the READ CURRENT or READ NEXT commands on another sequence file may state that these operations may never be performed on the sequence file whereas the VERIFY CURRENT and VERIFY NEXT commands can always be performed. In other words, the Current Value stored as current state data in the pseudo-random number sequence file is never exposed by the integrated circuit/smart card but knowledge of the current state can be verified by an external entity using the card. This is an example of using a pseudo-random number sequence file according to the present invention for authentication.

Figure 6:
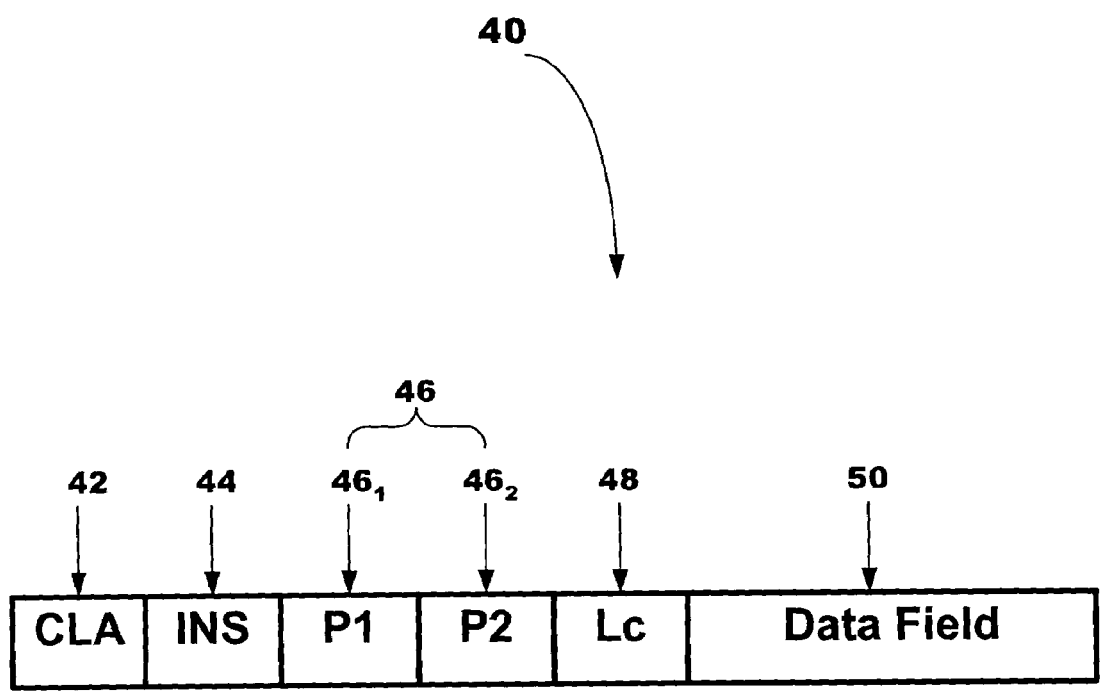
FIG. 6 is a schematic representation of a smart card Application Protocol Data Unit (APDU) providing the command functionality for an integrated circuit/smart card embodying a pseudo-random number sequence file according to the present invention.

FIG. 7 is a flowchart showing an exemplary method 100 that illustrates the operations implemented by the integrated circuit/smart card of FIG. 4 embodying a pseudo-random number sequence file according to the present invention as exemplarily illustrated in FIGS. 5A, 5B, 5C in response to external commands, e.g., from a card reader or terminal, using the command structure depicted in FIG. 6 and some of the unique commands described above. The example of FIG. 7 begins with selection of the sequence file 30 on the ICC or smart card 10 in a first step 102. The method 100 then issues a unique command to perform an operation on the selected sequence file 30 in step 104. Based on the security condition(s) of the command, a test is then made as to whether the security status of the ICC satisfies the security condition(s) of the command in step 106. If the answer is "no", the process is exited at step 108.

If the answer is "yes" the method 100 updates the Current Index stored in the current state data set 34 of the sequence file 30 if called for by the command in step 110. The method 100 then implement the pseudo-random number algorithm code 32 to generate a new instance of the pseudo-random number sequence, i.e., a new Current Value, corresponding to the Current Index in step 112 (if required) and checks whether the command is a READ CURRENT command in step 114. If the command is a READ CURRENT command, the method 100 returns the Current Value of the random number sequence as generated in step 112 in step 116. If the command is not a READ CURRENT command, the process then checks whether the command is a VERIFY CURRENT command in step 118. If it is, then the process returns TRUE if the Current Value stored in the current state data set 34 equals the value in the data field 50 of the VERIFY CURRENT command; otherwise, FALSE is returned in step 120. If the command is not a VERIFY CURRENT command, then the process exits at step 122.

Utility and Application:

A low-cost, portable and tamper-resistant source of pseudo-random numbers such as that provided by the pseudo-random number sequence file of this invention can be used in a number of trusted computing applications and information technology systems.

Figure 8:
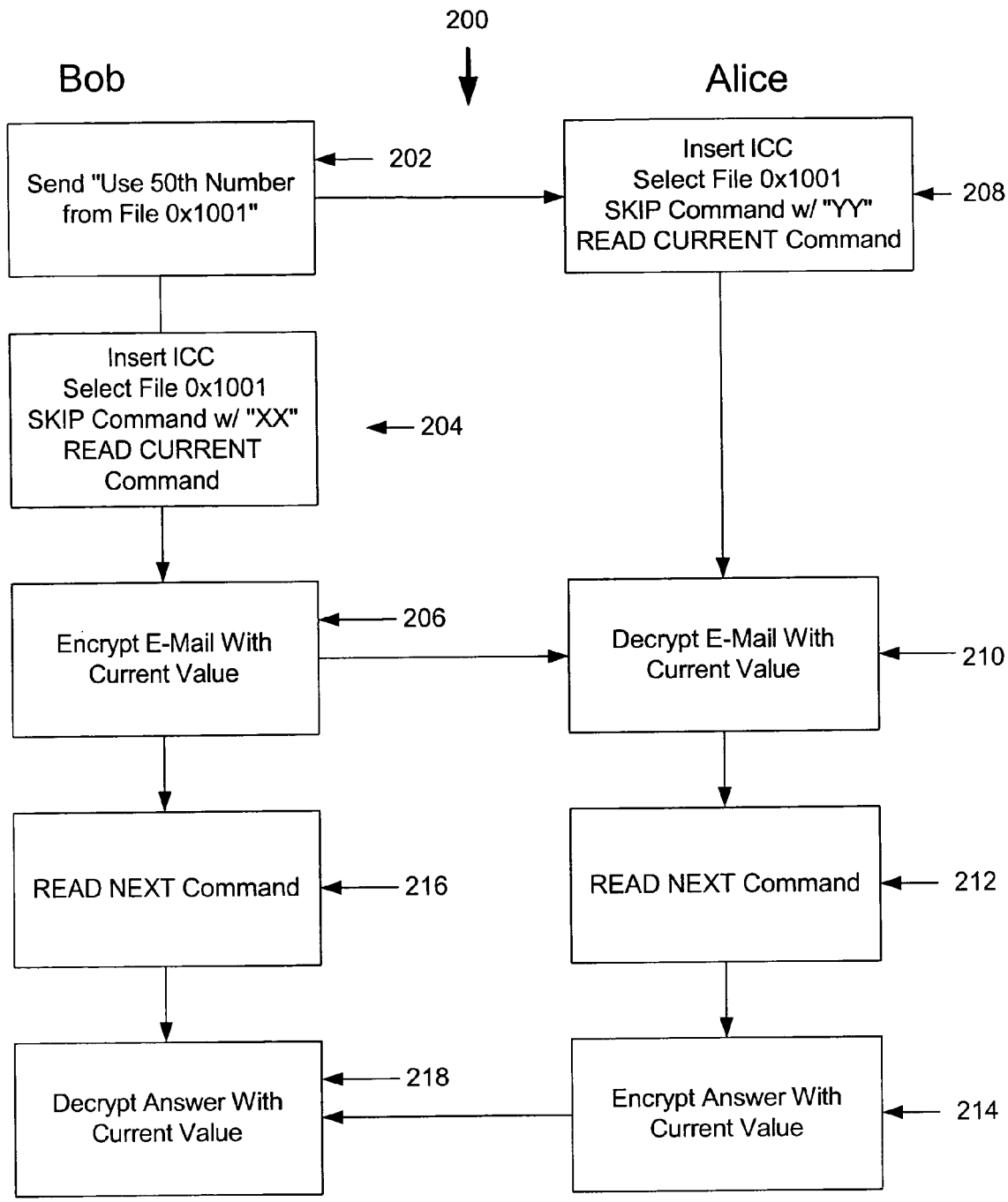
FIG. 8 is a process flow representation of a method of applying the integrated circuit/smart card embodying a pseudo-random number sequence file according to the present invention to protect personal e-mails exchanged between parties.

As a simple example, suppose two individuals such as Bob and Alice wish to communicate secretly via e-mail. Suppose further that each individual was provided with an integrated circuit/smart card 10 that contained the exact same pseudo-random number sequence file 30 as the other individual. An exemplary method 200 of using the integrated circuit/smart card 10 of FIG. 4 embodying a pseudo-random number sequence file 30 according to the present invention, as exemplarily illustrated in FIG. 5A, using the command structure depicted in FIG. 6 and some of the unique commands associated with the pseudo-random number sequence file 30 for protecting personal e-mails is illustrated in FIG. 8 using instances of the pseudo-random number sequence from the sequence file 30 as the keys for encrypting and decrypting personal e-mails. (While not described or illustrated in the following example, it should be appreciated that the card 10 may be configured such that individuals accessing the pseudo-random number sequence files 30 of their integrated circuit/smart cards 10 need to enter their Personal Identification Numbers in order to satisfy the security conditions of the commands to be used).

When one individual, e.g., Bob, wishes to exchange secure e-mails with another individual, e.g., Alice, where both individuals have access to identical pseudo-random number sequence files 30 on their respective integrated circuit/smart cards 10, the first individual (Bob) would transmit an insecure e-mail to the other individual (Alice) in a first step 202 apprising the other individual of the identity of the pseudo-random number sequence file 30 that will be used for encrypting and decrypting e-mails. This e-mail will also identify which particular instance, i.e., Current Value, of the pseudo-random number sequence in the current state data set 34 of the sequence file 30 to use as the starting point for encryption (by Bob) and decryption (by Alice) of the first secure e-mail by identifying a selected Current Index.

For example, as part of step 202 (prior to sending the insecure e-mail to Alice), Bob can use the CHANGE PARAMETER command (with zero values for the P1 and P2 byes $46_1$, $46_2$ and no data) to query the current state data set 34 of his integrated circuit/smart card 10 to determine the value of the Current Index stored therein. Once Bob has identified the Current Index stored in the current state data set 34 on his card 10, Bob can then select a suitable Current Index as the starting point for generating Current Values for use by both Bob and Alice in encrypting and decrypting their personal e-mails. With respect to the example illustrated in FIG. 8, Bob has determined that the value of the Current Index where i=50 is suitable for both Alice and him to use as starting point for exchanging encrypted (secure) e-mails.

Next, in step 204 Bob generates the Current Value associated with the Current Index selected in step 202. Using the SKIP command (he could also use the SET VALUE command) Bob sets a numerical value in the SKIP command (the 'XX' in FIG. 8 represents such numerical value) such that the selected Current Index is established in the current state data set 34 of his integrated circuit/smart card 10, which concomitantly causes the Current Value that is correlated to the selected Current Index to be generated and stored in the current state data set 34 of Bob's card 10.

Next, in step 206 Bob uses the READ CURRENT command to retrieve the Current Value of the random number sequence stored in the current state data set 34 of his integrated circuit/smart card 10 in step 204 from the sequence file 30, and encrypts his first e-mail to Alice using the retrieved Current Value as the key, and sends the encrypted e-mail to Alice.

Meanwhile, in response to the insecure e-mail sent by Bob in step 202, Alice, in step 208, determines the value of the Current Index stored in the current state data set 34 of her integrated circuit/smart card 10, e.g., using the CHANGE PARAMETER command in a manner similar to Bob as described in step 202 above, updates the value of the Current Index, and concomitantly the Current Value, stored in the current state data set 34 to the Current Index selected by Bob in step 202 using, e.g., the SKIP command, or alternatively the SET VALUE command, in a manner similar to Bob as described above (the 'YY' in FIG. 8 represents the numerical value used by Alice in the command), and retrieves the value of the updated Current Value from the current state data set 34 of her card 10 using the READ CURRENT command.

In step 210, Alice uses the Current Value retrieved from the current state data set 34 as the key to decrypt the encrypted e-mail from Bob. In step 212, Alice uses the READ NEXT command to generate and retrieve the next instance of the pseudo-random number sequence, i.e., a new Current Value, from her pseudo-random number sequence file 30. In step 214, Alice uses the new Current Value from her sequence file 30 as the key to encrypt her e-mail answer to Bob's e-mail and transmit it to Bob.

After transmitting his encrypted e-mail to Alice in step 206, Bob uses the READ NEXT command in a step 216 to generate and retrieve the next instance of the pseudo-random number sequence, i.e., a new Current Value, from the pseudo-random number sequence file 30 of his integrated circuit/smart card 10. Since the method 200 described herein results in an initial Current Value that is synchronized between the smart cards 10 of Bob and Alice, the new Current Value retrieved by Bob in step 216 is synchronized with the Current Value used by Alice in step 214 to encrypt the e-mail transmitted to Bob. Accordingly, the Current Value retrieved by Bob in step 216 is used in step 218 to decrypt the encrypted e-mail transmitted by Alice in step 214.

Bob and Alice can repeatedly use the READ NEXT command to generate new values of the Current Value in their respective integrated circuit/smart cards 10 for encrypting and/or decrypting personal e-mails exchanged therebetween. In the application described in the preceding paragraphs, smart cards 10 endowed with sequence files 30 according to the present invention function as what are known in the cryptographic art as "one time pads."

As another simple example suppose that a stream of data such as a stream of audio or video data were to be sent a particular individual over an insecure communication channel. Suppose further that the stream were composed of a sequence of packets, $P_1, P_2, \ldots P_n$, as for example would be the case if the stream were to be sent over the public Internet. Next, let $N_1, N_2, \ldots N_m$ be the sequence of pseudo-random numbers provided by a sequence file 30 according to the present invention on a smart card 10 held by the intended recipient of the digital stream. Suppose finally that the series of packets that are sent over the Internet to the individual, $Q_1, Q_2, \ldots Q_n$ is defined as follows:

$Q_i$=encryption of $P_i$ using $N_j$ where $j$=integer part of $(1+i/K)$

In other words, the first K packets are encrypted with $N_1$, the second K packets are encrypted with $N_2$, and so forth by the digital stream provider. Before reception of the stream is commenced, the recipient enters a valid PIN value into the smart card 10 containing the sequence file according to the present invention that provides the current instance, i.e., the Current Value $N_j$, of the pseudo-random number sequence $N_1, N_2 \ldots N_m$ to enable this sequence to be read from the card using the READ NEXT command described herein. When reception begins, the receiving device performs a READ NEXT operation for every K packets received in order to determine the key, i.e., the specific instance of $N_1$, $N_2, \ldots N_m$ needed to decrypt the next K packets.

Figure 9:
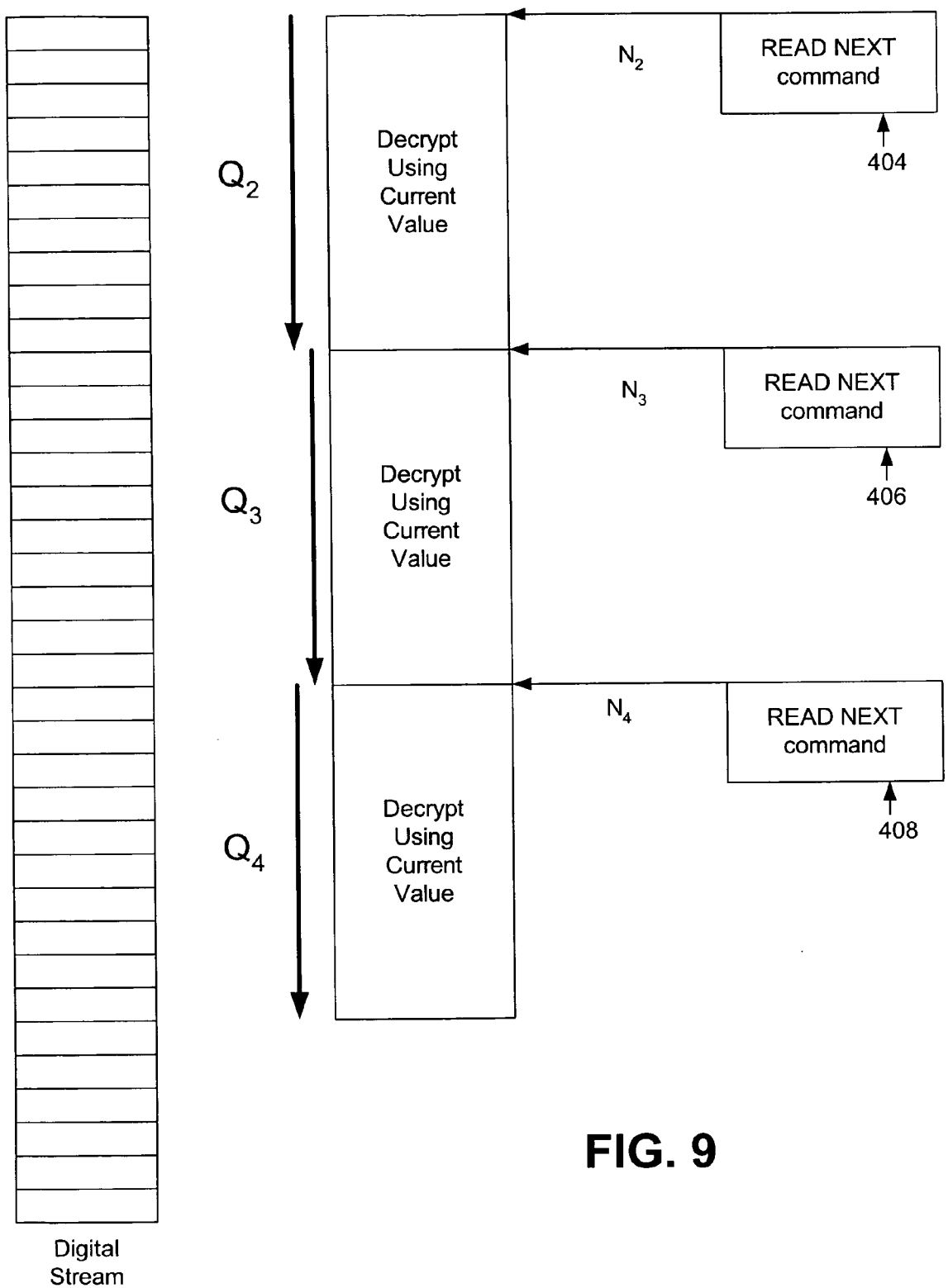
FIG. 9 is a process flow representation of a method of applying the integrated circuit/smart card embodying a pseudo-random number sequence file according to the present invention to decrypt a digital stream of encrypted multi-media content.

FIG. 9 is a partial illustration of a method of using a sequence file of an integrated circuit/smart card (not depicted) according to the present invention to decrypt an encrypted digital stream as described in the preceding paragraphs. In illustrative steps 404, 406, 408, READ NEXT commands are directed to the card by the receiving device, which causes the Current Index of the current state data set of the sequence file to be incremented by one (1) and the pseudo-random number sequence generator to be executed to generate the current instances or the Current Values, i.e., $N_2$, $N_3$, $N_4$, respectively, of the pseudo-random number sequence on an as-required basis. These Current Values $N_2$, $N_3$, $N_4$, are then used to decrypt the encrypted series of packets $Q_2$, $Q_3$, $Q_4$, respectively.

Figure 10:
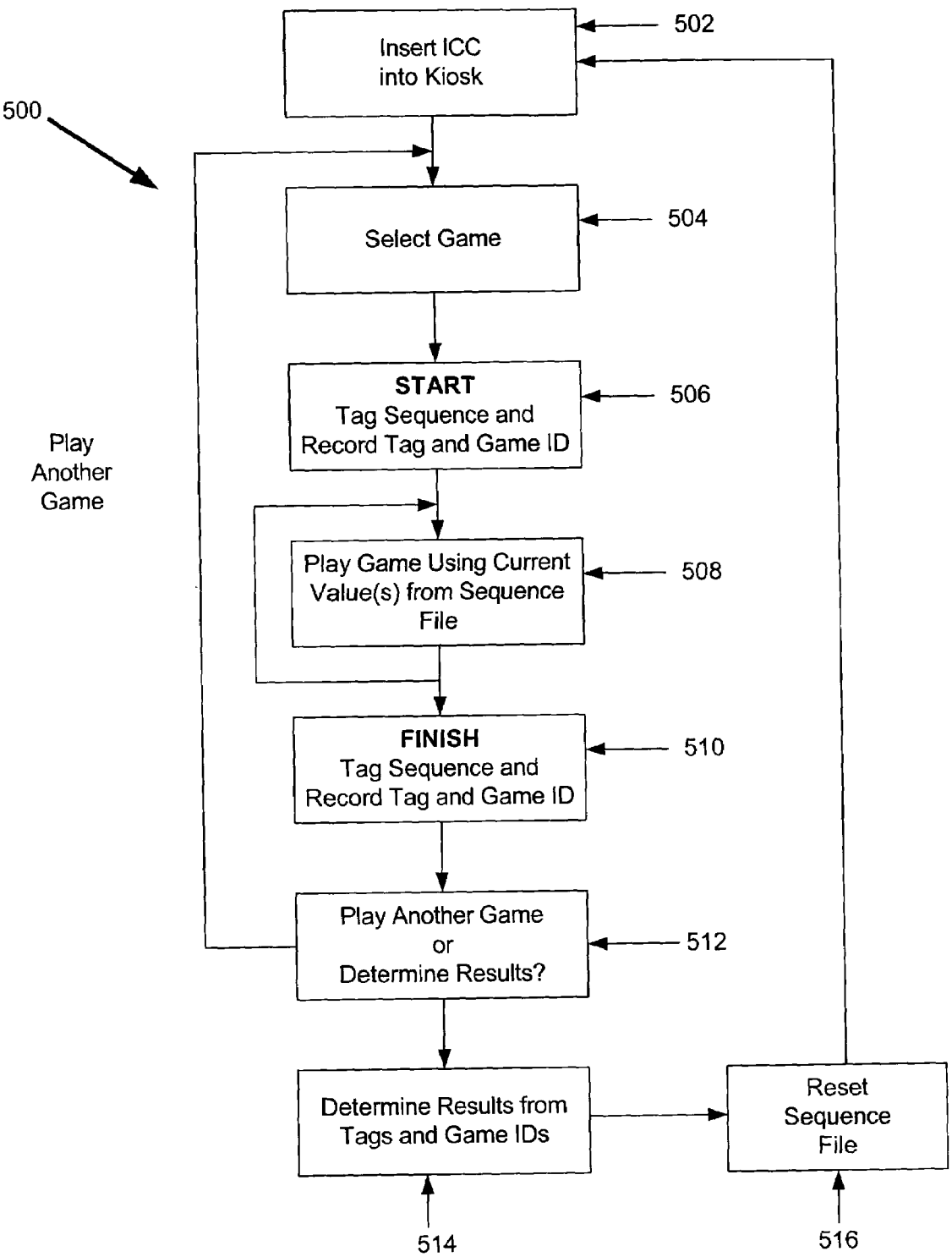
FIG. 10 is a process flow representation of a method of applying the integrated circuit/smart card embodying a pseudo-random number sequence file according to the present invention to play a selected game of chance.

A third exemplary method 500 of using a sequence file on a smart card according to the present invention in games of chance scenario is depicted in FIG. 10. Suppose that an ATM machine also had a gaming feature. When the cardholder inserts a smart card with a sequence file into the ATM in a first step 502 the ATM machine acquires the cardholder's PIN as usual. Rather than electing a banking function, the cardholder elects to play a game of chance as depicted in step 504. The ATM machine then authenticates itself to the card so that it can successfully execute TAG and READ NEXT commands against the sequence file of the card to complete step 504. In step 506, the ATM uses the TAG command to identify the Current Index stored in the current state data set of the pseudo-random number sequence file, which provides the baseline for determining the sequence of pseudo-random numbers that will be used by the ATM to determine the outcomes of the selected game of chance. The ATM machine uses the TAG command with an identifier of the selected game of chance recorded in the data field to correlate play of the selected game with the sequence of pseudo-random numbers starting at the current state. The ATM machine then uses the current instance of the random number sequence, as represented by the Current Value stored in the current state data set, that is returned by the READ NEXT command to uniquely determine the game of chance display on the screen of the ATM machine such as a slot machine or a poker game in step 508. For any selected game, step 508 can be repeated at the discretion of the player, with each succeeding play of the selected game using the next instance, i.e., new Current Value, of the random number sequence that is generated by the READ NEXT operation. Note that only an authorized ATM machine can advance the Current Index in the sequence file and only an authorized ATM may use the TAG command to associate states of the pseudo-random number sequence with the identifiers of selected games of chance.

After playing the selected game of chance any desired number of times based on the sequence file using the READ NEXT command in step 508, the cardholder can implement step 510 to terminate play of the currently-selected game of chance. This involves the use of the TAG command again to record the final value of the Current Index of the sequence file of the player's card. In step 512, the cardholder has the option of selecting another game of chance to play (return to step 504) or having his/her winnings/losses tallied in a step 514.

In step 514, the smart card is presented to a payoff authority. The payoff authority authenticates itself to the smart card and uses the TAG command to read out the parameters of the pseudo-random number generator and the starting and ending Current Index associated with each play of each selected game of chance. Using the Current Index tagged in step 506 and the Current Index retrieved by the operation of the TAG command, the payoff authority can thereby determine the exact sequence of pseudo-random numbers generated by the sequence file. This sequence of generated random numbers completely determines the behaviour of the games of chance indicated by the tag value and therefore the payoff. Based on the Current Index, which allows the payoff agent to determine the sequence of random numbers used by the cardholder and therefore results of playing the selected game(s) in step 508, the payoff agent takes the appropriate action with respect to the cardholder's value account (either crediting the account if the cardholder has won or debiting the account if the cardholder has lost). After the appropriate action has been taken, the payoff agent then resets the sequence file to its initial state using the RESET command in step 516.

These three examples are specifically constructed to illustrate the utility and application of a low-cost, portable and tamper-resistant source of pseudo-random numbers such as that provided by the pseudo-random number sequence file of the present invention. Those skilled in the art will recognize that the cryptographic and gaming protocols used are for illustrative purposes only and are not intended to limit the subject invention described herein.

A variety of modifications and variations of the above invention are possible in light of the foregoing teachings. It is therefore to be understood that, within the scope of the appended claims, the present invention may be practiced other than as specifically described herein.

What is claimed is:

1. An integrated circuit card, comprising:
a microprocessor;
a memory system integral with said microprocessor; and
one or more pseudo-random number sequence files stored in said integral memory system, said one or more pseudo-random number sequence files including
a pseudo-random number sequence algorithm code operative to generate a current instance of a pseudo-random number sequence when executed;
a parametric data set for said pseudo-random number algorithm code wherein said parametric data set includes values for parameters of said pseudo-random number algorithm code; and
a current state data set for said pseudo-random number algorithm code, for storing information associated with said one or more pseudo-random number algorithm codes, said current state data set including at least an Initial Value defining an initial state value for the pseudo-random number sequence;
wherein said microprocessor is operative to execute an operation on one of said pseudo-random number sequence files in response to a predetermined input; and
wherein said information stored in said current state data set comprises a Current Index having a value that identifies each current instance of the pseudo-random number sequence generated by said pseudo-random number algorithm code and a Current Value having a value equal to the current instance of the pseudo-random number sequence generated by said pseudo-random number algorithm code.

2. An integrated circuit card, comprising:
a microprocessor,
a memory system integral with said microprocessor, and
one or more pseudo-random number sequence files stored in said integral memory system, said one or more pseudo-random number sequence files including
a pseudo-random number sequence algorithm code operative to generate a current instance of a pseudo-random number sequence when executed;
a parametric data set for said pseudo-random number algorithm code wherein said parametric data set includes values for parameters of said pseudo-random number algorithm code; and
a current state data set for said pseudo-random number algorithm code, for storing information associated with said one or more pseudo-random number algorithm codes, said current state data set including at least an Initial Value defining an initial state value for the pseudo-random number sequence;
wherein said microprocessor is operative to execute an operation on one of said pseudo-random number sequence files in response to a predetermined input;
wherein said information stored in said current state data set comprises a Current Index having a value that identifies each current instance of the pseudo-random number sequence generated by said pseudo-random number algorithm code and a Current Value having a value equal to the current instance of the pseudo-random number sequence generated by said pseudo-random number algorithm code;

wherein the predetermined input is a READ CURRENT command from an external source addressed to one of said one or more pseudo-random number sequence files; and wherein said microprocessor is operative in response to said READ CURRENT command to retrieve said Current Value from said current state data set of said addressed pseudo-random number sequence file and return said Current Value to the external source.

* * * * *